(12) United States Patent
McGregor

(10) Patent No.: US 6,781,132 B2
(45) Date of Patent: Aug. 24, 2004

(54) COLLIMATED RADIATION DETECTOR ASSEMBLY, ARRAY OF COLLIMATED RADIATION DETECTORS AND COLLIMATED RADIATION DETECTOR MODULE

(75) Inventor: Douglas S. McGregor, Riley, KS (US)

(73) Assignee: The Regents of the University of Michigan, Ann Arbor, MI (US)

( * ) Notice: Subject to any disclaimer, the term of this patent is extended or adjusted under 35 U.S.C. 154(b) by 223 days.

(21) Appl. No.: 10/215,128

(22) Filed: Aug. 8, 2002

(65) Prior Publication Data

US 2003/0034456 A1 Feb. 20, 2003

Related U.S. Application Data

(60) Provisional application No. 60/911,403, filed on Aug. 10, 2001.

(51) Int. Cl.[7] ................................. G01T 1/24
(52) U.S. Cl. ............... 250/370.09; 250/370.01; 250/336.1
(58) Field of Search ............ 250/370.09, 370.01, 250/336.1

(56) References Cited

U.S. PATENT DOCUMENTS

| | | | |
|---|---|---|---|
| 5,391,881 A | 2/1995 | Jeuch et al. | |
| 5,391,882 A | 2/1995 | Rhigger | |
| 5,449,908 A | 9/1995 | Wadsworth et al. | |
| 5,530,249 A | 6/1996 | Luke | |
| 5,587,585 A | 12/1996 | Eisen et al. | |
| 5,616,925 A | 4/1997 | Rhiger et al. | |
| 5,627,377 A | 5/1997 | Hamilton, Jr. et al. | |
| 5,677,539 A | 10/1997 | Apotovsky et al. | |
| 5,773,829 A | 6/1998 | Iwanczyk et al. | |
| 5,777,338 A | 7/1998 | He | |
| 5,847,398 A | 12/1998 | Shahar et al. | |
| 6,002,134 A | 12/1999 | Lingren | |
| 6,028,313 A | 2/2000 | McDaniel | |
| 6,037,595 A | 3/2000 | Lingren | |
| 6,043,495 A | 3/2000 | Verger et al. | |
| 6,046,454 A | 4/2000 | Lingren et al. | |
| 6,069,360 A | 5/2000 | Lund | |
| 6,169,287 B1 | 1/2001 | Warburton | |
| 6,172,362 B1 | 1/2001 | Lingren et al. | |
| 6,175,120 B1 | 1/2001 | McGregor et al. | |
| 6,215,123 B1 | 4/2001 | Orava et al. | |
| 6,236,508 B1 | 5/2001 | Stapelbroek | |
| 6,242,746 B1 | 6/2001 | Teranuma et al. | |
| 6,255,708 B1 | 7/2001 | Sudharsanan et al. | |
| 6,546,070 B1 * | 4/2003 | Francke ................ | 378/51 |

* cited by examiner

Primary Examiner—David Porta
Assistant Examiner—Christine Sung
(74) Attorney, Agent, or Firm—Brooks Kushman P.C.

(57) ABSTRACT

Collimated radiation detector assemblies, arrays of collimated radiation detectors and a collimated radiation electrode module are provided which offer the advantages of high gamma ray energy resolution and good gamma ray collimation for imaging capability. A conductive metal structure acts as an electromagnetic shield to produce the Frisch grid effect in a solid-state detector crystal or substrate of a detector. The structure may be a single structure or two parts connected together. The structure improves the gamma ray energy resolution response while at the same time serving as a gamma ray directional collimator. The assemblies, arrays and module can be manufactured from a variety of materials, including common semiconductors such as silicon, germanium, and cadmium-zinc-telluride. Assemblies can be stacked to produce a gamma ray imaging array. Also, various structures having several compartments for detectors or detector portions are provided.

45 Claims, 7 Drawing Sheets

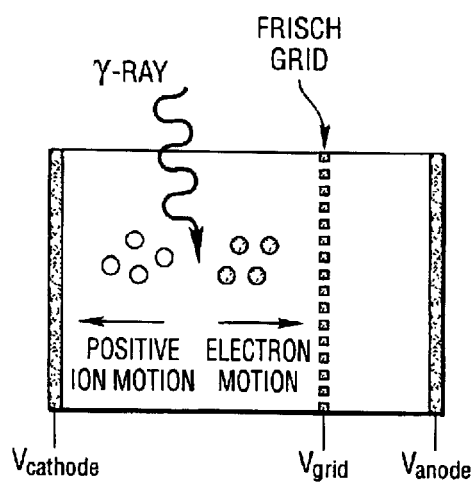
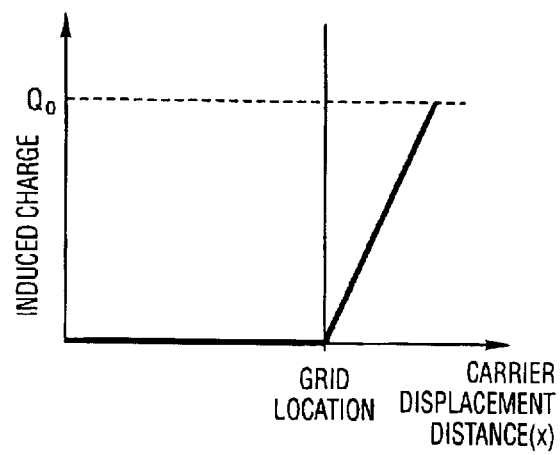
Fig. 1a (PRIOR ART)  Fig. 1b (PRIOR ART)
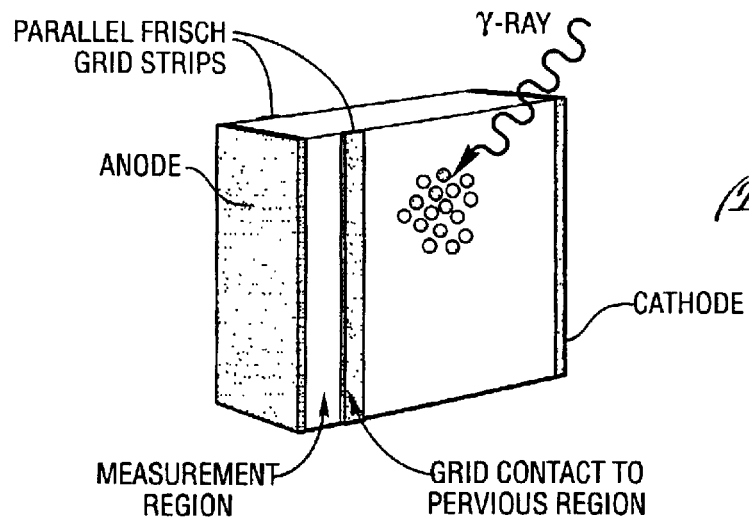
Fig. 2 (PRIOR ART)
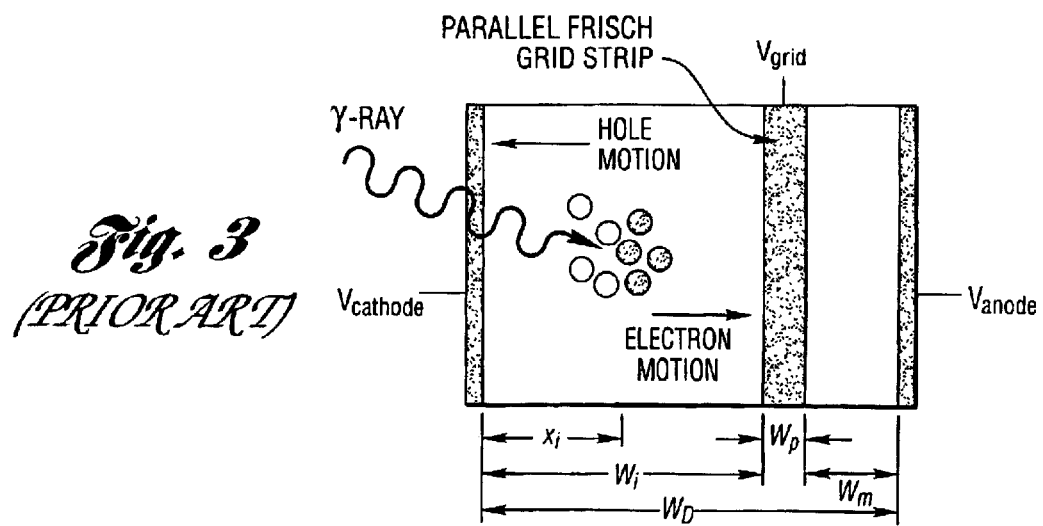
Fig. 3 (PRIOR ART)

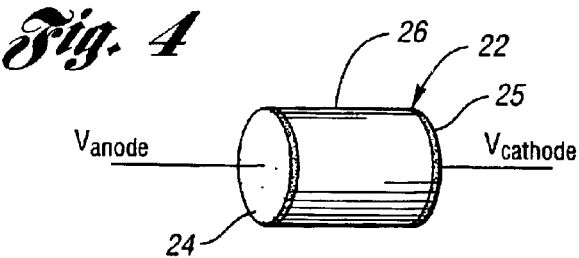
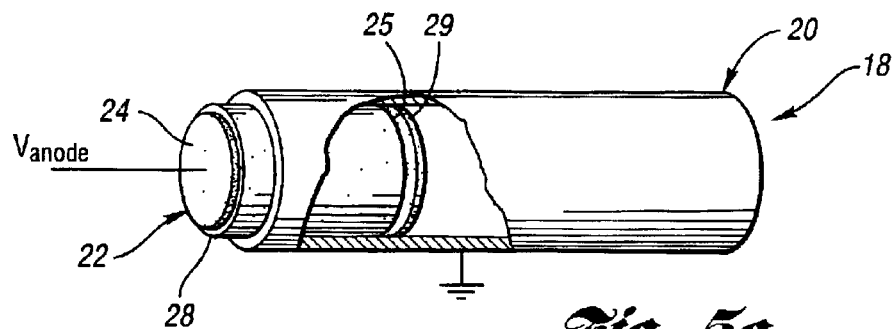
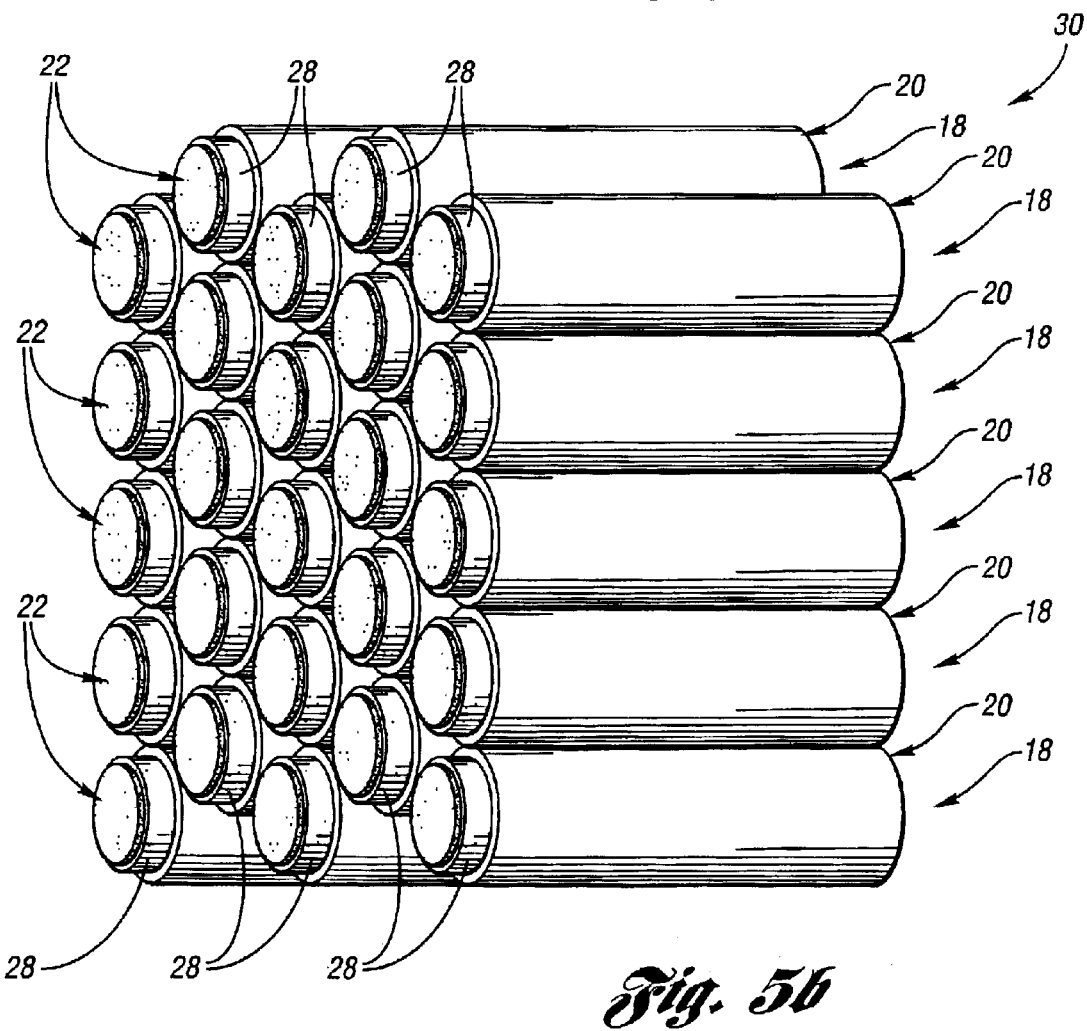

COLLIMATED RADIATION DETECTOR ASSEMBLY, ARRAY OF COLLIMATED RADIATION DETECTORS AND COLLIMATED RADIATION DETECTOR MODULE

CROSS-REFERENCE TO RELATED APPLICATION

This application claims the benefit of U.S. provisional application Ser. No. 60/311,403, filed Aug. 10, 2001.

BACKGROUND OF THE INVENTION

1. Field of the Invention

This invention relates to collimated radiation detector assemblies, arrays of collimated radiation detectors and collimated radiation detector modules.

2. Background Art

The material requirements for a room temperature operated high resolution semiconductor gamma ray spectrometer include large free charge carrier mobilities ($\mu$), or alternatively, high achievable free charge carrier velocities (v), long mean free drift times ($\tau^*$), a relatively large energy band gap ($E_g$) generally between 1.4 eV to 2.5 eV, high representative values of atomic number (Z), and availability of large volumes. Presently, no semiconductor has all of the listed ideal material properties desired for the "perfect" room temperature operated semiconductor radiation spectrometer, although many have a considerable fraction of the required properties. Some wide band gap compound semiconductors that offer promise as room temperature operated gamma ray spectrometers include GaAs, $HgI_2$, $PbI_2$, CdTe, and CdZnTe. One difficult problem to resolve with these materials is gamma ray energy resolution degradation from charge carrier trapping losses.

The general planar detector design that is used for compound semiconductor radiation detectors consists of a block of material with contacts fabricated on either side of the block. Spectroscopic measurements of gamma radiation interactions require that both electrons and holes be extracted efficiently from a conventional planar detector, hence the device dimensions are usually tailored to reduce trapping effects from the most effected charge carrier (usually holes). Generally, compound semiconductors have notable differences between the mobilities and mean free drift times of the electrons and holes. For instance, CdZnTe material has reported mobility values of 120 cm$^2$/V-s for holes and 1350 cm$^2$/V-s for electrons. Additionally, the reported mean free drift times are $2\times10^{-7}$ s for holes and $10^{-6}$ s for electrons. Hence, the effect of trapping losses is much more pronounced on holes than on electrons, and the device dimensions would have to be designed to compensate for the problem.

A similar situation is experienced with gas filled ion chambers, in which electron-ion pairs are produced by gamma ray interactions in the gas. The electron mobilities are much higher than the positive ion mobilities, hence the extraction times of the electrons are considerably less than the extraction times of the ions. For typically used integration times, the measured pulse amplitude becomes dependent on the initial gamma ray interaction location in the ion chamber. As a result, wide variations in pulse amplitude are possible. The problem was significantly reduced by Frisch with the incorporation of a grid in the ion chamber near the anode. The measured pulses from the detector corresponded to only the movement of mobile charges in the region between the grid and the anode, hence ion movement in the bulk of the device no longer affected the signal output.

The Frisch grid concept has been demonstrated with semiconductor detectors using a "co-planar" design. The devices work well, but unlike the true Frisch grid, they generally require more than one output signal or a circuit capable of discerning the different grid signals.

A simple planar semiconductor detector is operated by applying a bias voltage across the bulk of the material. Ionizing radiation excites electron-hole pairs that are drifted apart by the device electric field. Electrons are drifted towards the anode and holes are drifted towards the cathode. An induced charge is produced at the terminals of the device by the moving free charge carriers, and the induced charge can be measured by an externally connected circuit. Shockley and Ramo derived the dependence of the induced current and induced charge produced by point charges moving between electrodes, which was later shown to apply to semiconductor detectors as well.

The Shockley-Ramo theorem shows that the induced charge appearing at the terminals of a planar device from moving point charges is proportional to the distance displaced by the moving point charges, regardless of the presence of space charge. Hence, the change in induced charge Q* can be represented by $$\Delta Q^* = Q_o \frac{|\Delta x_e| + |\Delta x_h|}{W_D}, \quad (1)$$

where $Q_o$ is the initial charge excited by the interacting gamma ray, $W_D$ is the detector length, $\Delta x$ is the distance traveled by the electrons or holes, and the e and h subscripts refer to electrons or holes, respectively. With trapping, the total induced charge from a single gamma ray event in a planar semiconductor detector can be represented by $$Q^* = Q_o\{\rho_e(1-\exp[(x_i-W_D)/\rho_e W_D]) + \rho_h(1-\exp[-x_i/\rho_h W_D])\}, \quad (2)$$

where $x_i$ represents the interaction location in the detector as measured from the cathode and p is the carrier extraction factor represented by $$\rho_{e,h} = \frac{v_{e,h}\tau^*_{e,h}}{W_D}, \quad (3)$$

where v is the charge carrier velocity and $\tau^*$ is the carrier mean free drift time. From equations 2 and 3, it becomes clear that the induced charge (Q*) will be dependent on the location of the gamma ray interaction. Small values of $\rho$ for either holes or electrons will cause large deviations in Q* across the detector width. The induced charge deviation can be greatly reduced if a detector is designed such that the carrier with the longer mean free drift time and highest mobility contributes to all or most of the induced charge.

A Frisch grid gas ion chamber is designed to measure the induced charge primarily from electrons, and the general configuration and operation of a Frisch grid ion chamber is shown in FIGS. 1a and 1b. A gamma ray interaction occurring in the main volume of the detector excites electron-ion pairs. An externally applied electric field drifts the carriers in opposite directions, in which the electrons drift through the grid and into the measurement region of the device. From the Shockley-Ramo theorem, the induced charge produced at the anode results from charge carriers moving between the grid and the anode and not from charge motion between the cathode and the grid. As a result, the detector is primarily sensitive to only the electron charge carriers.

A simple semiconductor Frisch grid detector can be built using the design shown in FIG. 2. As shown, a semiconductor block is cut and polished with metal electrodes fabricated at the ends. These electrodes serve as the anode and cathode. Parallel metal contacts are fabricated on opposite faces of the device, which serve to act as the Frisch grid. The region between the cathode and the parallel Frisch grid is the interaction region, the region underneath the parallel grid is the pervious region, and the region between the parallel grid and the anode is the measurement region. The device is a three terminal device, with the electrodes biased such that electrons are drifted from the interaction region, through the pervious region between the parallel grid, and into the device measurement region.

The different regions and their designations are again shown in FIG. 3. A gamma ray event occurring in the interaction region will excite electron-hole pairs. Electrons are swept from the interaction region towards the parallel grid, however some trapping will occur as the electrons drift across the interaction region and the measurement region. Including the effect of trapping, the measured induced charge from electrons excited in the interaction region by a gamma ray event at a distance $x_i$ from the cathode will be $$Q^* = K(x, y) Q_o \rho_{em} \left(1 - \exp\left[\frac{-1}{\rho_{em}}\right]\right) \exp\left[\frac{x_i - \frac{W_p}{2} - W_i}{v_e \tau^* e}\right], \quad (4)$$

where K(x,y) is a correction factor for deviations in the weighting potential across the device and $$\rho_{em,hm} = \frac{v_{e,h} \tau^*_{e,h}}{\left(\frac{W_p}{2} + W_m\right)}, \quad (5)$$

where the symbols are shown in FIG. 3. It is assumed that the induced charge on the anode begins to increase primarily as the electrons transit across the middle of the pervious region. For gamma ray interactions that occur directly in the measurement region, the induced charge will now be dependent on both electron and hole motion within the measurement region. Including the effects of electron and hole trapping, the induced charge from gamma ray events occurring in the measurement region is $$Q^* = Q_o K(x, y) \rho_{em} \left(1 - \exp\left[\frac{(x_i - W_D)}{\rho_{em}\left(\frac{W_p}{2} + W_m\right)}\right]\right) +$$

$$Q_o K(x, y) \rho_{hm} \left(1 - \exp\left[\frac{\left(W_D - x_i - W_m - \frac{W_p}{2}\right)}{\rho_{hm}\left(\frac{W_p}{2} + W_m\right)}\right]\right) \quad (6)$$

The device is designed such that the measurement region is considerably smaller than the interaction region. Assuming fairly uniform irradiation of the device (for instance, from the detector side), the fraction of events occurring in the interaction region can be approximated by $$F_i \approx \frac{W_i + \frac{W_p}{2}}{W_D} = \frac{2W_i + W_p}{2(W_i + W_p + W_m)}. \quad (7)$$

Semiconductor Frisch grid detectors based on the side grid design have been demonstrated as viable detectors. The devices show improved results over the simple planar detector designs, and they perform well with only one preamplifier output per device. As a result, the semiconductor Frisch grid is a much simpler device to operate and manufacture, much more so than co-planar or micro-pixelated devices.

Semiconductor-based imaging arrays offer improved performance over present scintillator-based imagers (such as Anger cameras) due to their energy higher resolution and the ability to make small detector arrays. Since $HgI_2$ and CdZnTe materials can be operated at room temperature, the operation of semiconductor imaging arrays can be significantly simplified. Unfortunately, most room temperature operated semiconductor materials that are attractive for gamma ray spectroscopy suffer from charge carrier trapping losses, hence the gamma ray energy resolution is greatly compromised unless a resolution enhancing technique is used.

Present methods under investigation for semiconductor-based gamma ray imaging arrays generally involve the use of large blocks of semiconductors upon which numerous detector pixels have been fabricated. Since the devices essentially share the same bulk material, signals induced by charge motion can cause shared signals between adjacent pixels, which works to decrease the spatial resolution. Additionally, energy resolution enhancement is accomplished primarily through virtual Frisch grid techniques, such as with co-planar electrode designs and the "small pixel effect." Such schemes often require complicated electronic readouts that add to the manufacturing expenses.

Due to problems with scattered gamma rays blurring the images, heavy metal collimators are often used in conjunction with an imaging detector. The collimator significantly reduces the detection of gamma rays that originate or scatter from locations that are not directly aligned with the collimator. These collimators are almost always attached to the detector array after the device array has been constructed.

U.S. Pat. No. 6,175,120 to McGregor et al. discloses a high resolution, solid state, ionization detector and an array of such detectors.

The following U.S. patents are also relevant: U.S. Pat Nos. 5,847,398; 5,627,377; and 5,587,585.

SUMMARY OF THE INVENTION

An object of the present invention is to provide a high resolution collimated radiation detector assembly, an array of collimated radiation detectors and a collimated radiation detector module.

In carrying out the above object and other objects of the present invention, a collimated radiation detector assembly is provided. The assembly includes a high resolution radiation detector including an ionization substrate having first, second and third surfaces. The second surface opposes the first surface and the third surface is located between the first and second surfaces. The detector further includes a first electrode disposed at the first surface and a second electrode disposed at the second surface. The assembly also includes a structure having a housing with a compartment for housing the detector. The structure also has a conductive collimator aligned with the housing for collimating radiation to the detector. The housing divides the substrate into interaction, measurement and pervious regions.

The housing and the collimator may form a single structure or may be separate structures which are connected together.

The housing may act as a grid such as a Frisch grid.

The measurement region of the substrate may extend out of the housing and the pervious and interaction regions may extend into the housing.

The length of the compartment may be greater than the length of the pervious and interaction regions.

The radiation detector may be a semiconductor radiation detector such as a single-charge carrier radiation detector.

The radiation detector may be a planar semiconductor detector or a room temperature, gamma ray or x-ray detector.

The assembly may further include insulating material disposed between the housing and the third surface in the compartment to insulate the housing from the third surface.

The assembly may further include a member disposed in the compartment of the housing for coupling the second electrode to the housing. The member may be conductive to electrically couple the second electrode to the housing.

The detector may be a pixelated detector having a plurality of separate detector portions and a plurality of electrodes disposed thereon. Further, the housing may have a plurality of separate compartments for housing the detector portions.

The substrate may have tapered between the first and second surfaces to provide geometric weighting to the detector.

The first electrode may be substantially smaller than the second electrode to improve detected radiation energy resolution.

The assembly may further include a shield attached to the collimator to shield the detector from electromagnetic noise.

Further, in carrying out the above objects and other objects of the present invention, an array of collimated radiation detectors is provided wherein each of the detectors is a detector assembly as described above.

The array may be an imaging array such as a gamma ray or x-ray imaging array. The imaging array may be a semiconductor-based imaging array.

Still further in carrying out the above objects and other objects of the present invention, an array of collimated radiation detectors is provided. The array includes a plurality of high resolution radiation detectors wherein each of the detectors includes an ionization substrate having first, second and third surfaces. The second surface opposes the first surface and the third surface is located between the first and second surfaces. Each of the detectors further includes a first electrode disposed at its first surface and a second electrode disposed at its second surface. The array also includes a structure including a housing having a plurality of separate compartments for housing the detectors. The structure also includes a conductive collimator aligned with the housing for collimating radiation to the detectors. The housing divides each of the substrates into interaction, measurement and pervious regions.

The housing and the collimator may be formed from a single structure of high-density material or the housing and the collimator may include an array of sheets of high-density material for separating adjacent detectors. The sheets may be corrugated.

The array may be an imaging array such as a gamma ray or x-ray imaging array. The imaging array may be a semiconductor-based imaging array.

Each of the substrates may be tapered between its first and second surfaces to provide geometric weighting to the detectors.

The first electrode of each of the detectors may be substantially smaller than the second electrode to improve detected radiation energy resolution.

The array may include a shield attached to the collimator to shield the detectors from electromagnetic noise.

The housing and the collimator may include at least one slotted structure of high-density material.

Yet further in carrying out the above object and other objects of the present invention a collimated radiation detector module is provided. The module includes an array of collimated radiation detectors having a plurality of high resolution radiation detectors. Each of the detectors includes an ionization substrate having first, second and third surfaces, the second surface opposing the first surface and the third surface being located between the first and second surfaces. Each of the detectors further includes a first electrode disposed at its first surface and a second electrode disposed at its second surface. The array further has a structure including a housing having a plurality of separate compartments for housing the detectors. The structure also includes a conductive collimator aligned with the housing for collimating radiation to the detectors. The housing divides each of the substrates into interaction, measurement and pervious regions. The module further includes circuitry for collecting signals from the detectors and a lid connected to the structure for covering the circuitry.

The module may further include soft conductive material for establishing electrical connections with the first and second electrodes of the detectors.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1a is a side, schematic view of a Frisch grid gas detector wherein the gas detector volume is separated into an interaction region and a measurement region; electron charge carriers are drifted towards the anode by an applied bias;

FIG. 1b is a graph which illustrates that the induced charge that appears at the anode is zero until the electrons pass through the grid; after passing through the grid, a charge is induced proportional to the distance traveled by the charge carriers between the grid and the anode;

FIG. 2 is a perspective, schematic view of a prototype semiconductor parallel strip Frisch grid, showing the anode, cathode, and parallel grid configuration; charge carriers are excited in the interaction region and the electrons are drifted through the parallel strip Frisch grid to the measurement region by an applied electric field;

FIG. 3 is a side, schematic view of a Frisch grid wherein the interaction region is much larger than the measurement region; as a result, most of the measured induced charge appears from electrons drifted from the interaction region into the measurement region and not from electron-hole pairs excited in the measurement region;

FIG. 4 is a perspective, schematic view of a planar semiconductor detector including a semiconductor substrate and first and second electrodes or contacts which act as an anode and a cathode, respectively;

FIG. 5a is a perspective, schematic view, partially broken away and in cross section, of an assembly of the present invention including a conductive plate connected to the cathode of the detector of FIG. 4; the cathode is thereby grounded with the housing and the collimator parts of a structure;

FIG. 5b is a perspective, schematic view of an array of collimated radiation detectors wherein each of the detectors is a detector assembly as shown in FIG. 5a;

FIG. 6b is a perspective, schematic view of another embodiment of an array of assemblies of FIG. 6a;

FIG. 7b is a perspective, schematic view of yet another embodiment of an array of assemblies of FIG. 7a;

DETAILED DESCRIPTION OF THE PREFERRED EMBODIMENTS

Figure 6A:
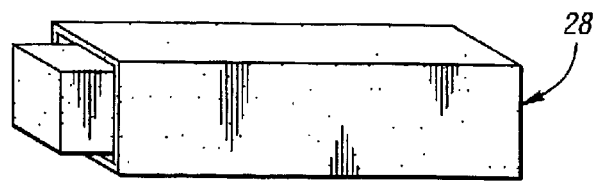
FIG. 6a is a perspective, schematic view of another embodiment of a detector assembly of the present invention.

In general, the present invention involves a single or multi-part structure which forms a combined Frisch grid housing and collimator. The housing acts as an external Frisch grid on a semiconducting or semi-insulating detector. The device uses an external Frisch grid housing that wraps around the outside of the detector. In the embodiment of FIGS. 5a and 5b, the housing and the collimator are formed from a single structure 20. The structure 20 is designed to extend longer than the length of the device so as to serve not only as a detector housing but also as a collimator.

FIG. 5a illustrates a collimated radiation detector assembly, generally indicated at 18, including an external Frisch grid housing of the structure 20, used to improve the energy resolution of a gamma ray semiconductor detector, generally indicated at 22, in FIGS. 4 and 5a. In the present invention, the simple planar designed detector 22 can be used. The structure 20 is typically much longer than the detector 22, thereby serving as a long tube through which gamma rays must pass if they are to interact in the detector 22 volume. FIG. 5a illustrates how the detector 22 fits within the housing of the structure 20 which is shown as a hollow cylinder with a collection contact (i.e., anode) or electrode 24 extending from the housing of the structure 20. A cathode contact or electrode 25 is positioned within the housing of the structure 20.

In the present case, the measurement region of an ionization substrate 26 (i.e., FIG. 4) of the detector 22 is the portion of the detector 22 extending from the structure 20, the pervious region of the substrate 26 is the remaining length of the detector 22, and the interaction region of the substrate 26 is also the remaining length of the detector 22. Hence, in the present invention, the pervious region and the interaction region can be of the same length.

FIGS. 4 and 5a show one possible method of attaching external circuitry to the detector 22, in which the cathode is facing into the structure 20 and the anode is facing out from the structure 20. A positive voltage can be applied to the anode and a negative voltage can be applied to the cathode. The conductive structure 20 can be grounded, as shown in FIG. 5a. The basic voltage biasing scheme is to be arranged such that charge carriers excited within the detector 22 are drifted from the interaction region and into the measurement region.

FIG. 5a shows an insulating layer 28 placed around the detector 22. The insulating layer 28 prevents the device from short-circuiting to the conductive structure 20. The insulating layer 28 may be applied directly to the detector 22, or may be applied inside the housing of the structure 20, or may be an insulating insert that goes into the housing part of the structure 20, and may be a combination of these listed approaches.

The cathode and the structure 20 may both be held at ground and achieve the "separation effect" of the Frisch grid as desired. The "separation effect" is improved with the insulating layer 28 in place. Hence, the structure 20 and the cathode are held at the same voltage potential.

FIG. 5a also illustrates a conductive plate or stop 29 installed in the structure 20 that allows for the cathode electrode 25 to be directly connected to the structure 20. The conductive plate 29 is in contact with the structure 20 to divide the structure 20 into housing and collimator parts. The conductive plate 29 can be an insert or may be a conductive stop that is manufactured into the structure 20. The scheme allows for the cathode electrode 25 to be directly connected to the structure 20 without wires, thereby making electrical connections much more straightforward.

FIG. 5b shows one method by which multiple detector assemblies 18 can be stacked. The detector assemblies 18 can be grouped into an array 30 of detectors. Each of the anodes 24 can be attached to an electronic output, such as a preamplifier. The array 30 can be used for imaging of gamma rays or x-rays. The collimator Frisch grid will improve the gamma ray energy resolution of the devices.

FIGS. 6a, 6b, 7a and 7b show that many other detector geometrical designs can be used for the present invention that allow for efficient packing of the detector assemblies.

Figure 7A:
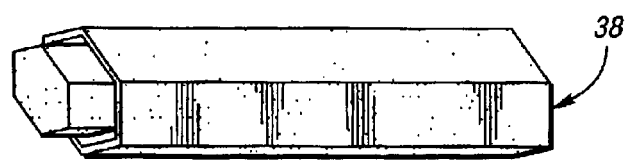
FIG. 7a is a perspective, schematic view of yet another embodiment of a detector assembly of the present invention.

In particular, FIGS. 6a and 7a show that the detector configuration is not confined to cylindrical geometries. It can be produced in a variety of detector shapes, including parallelepipeds 28, cubes, and hexagons 38.

Figure 6B:
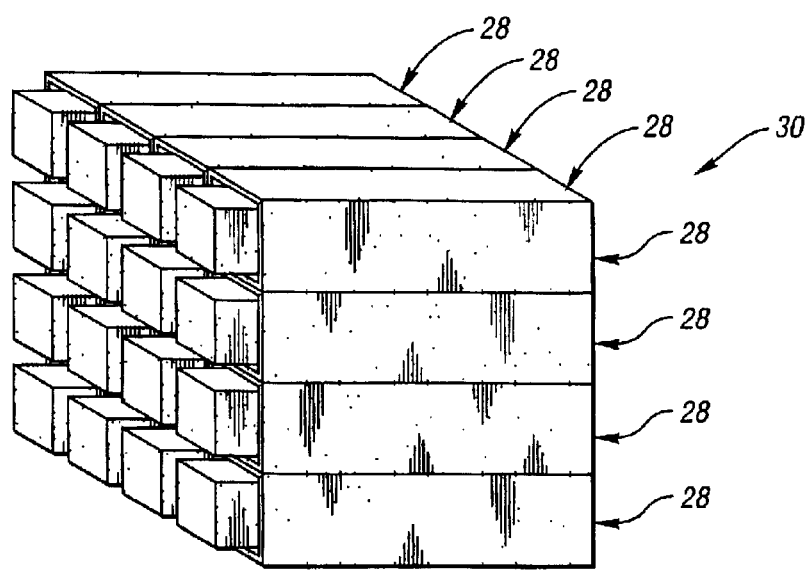
Figure 7B:
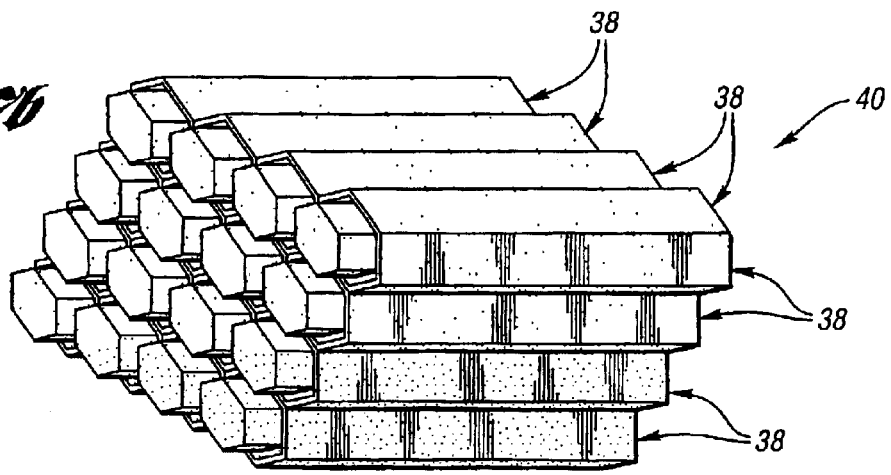

FIGS. 6b and 7b show that the cube, parallelepiped, and hexagonal designs allows for closer packing and less "dead space" between the detectors than does the cylindrical design for arrays 30 and 40, respectively.

Figure 8:
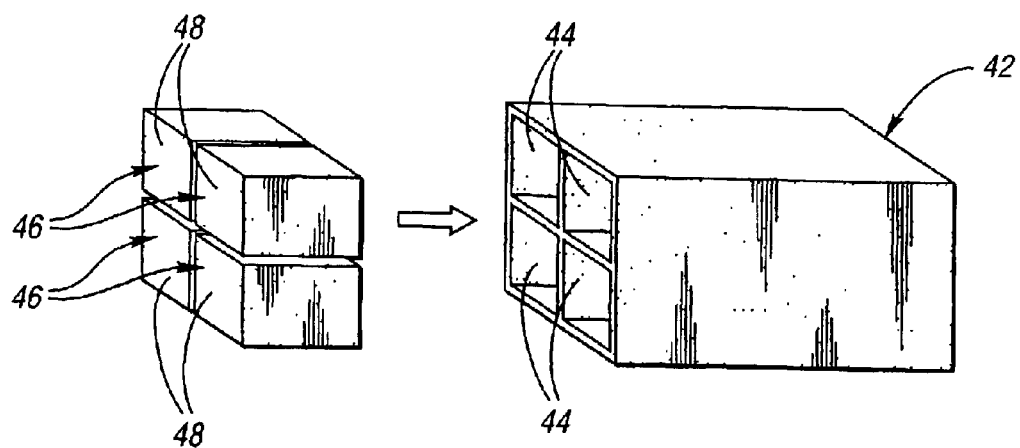
FIG. 8 is a perspective, schematic view of a plurality of separate planar semiconductor detectors to be inserted into a single structure including a housing and a collimator, the housing having multiple compartments for housing the detectors.

FIG. 8 illustrates a single conductive structure, generally indicated at 42, which includes housing and collimator parts or portions and which has several openings or compartments 44 within which many separate planar semiconductor detectors, generally indicated at 46, can be inserted. Cathodes of the detectors 46 can all be coupled to the structure 42 such that the cathodes and the structure 42 are all at the same potential, such as ground. Anodes 48 of the detectors 46 are individually attached to readout electronics.

Figure 9:
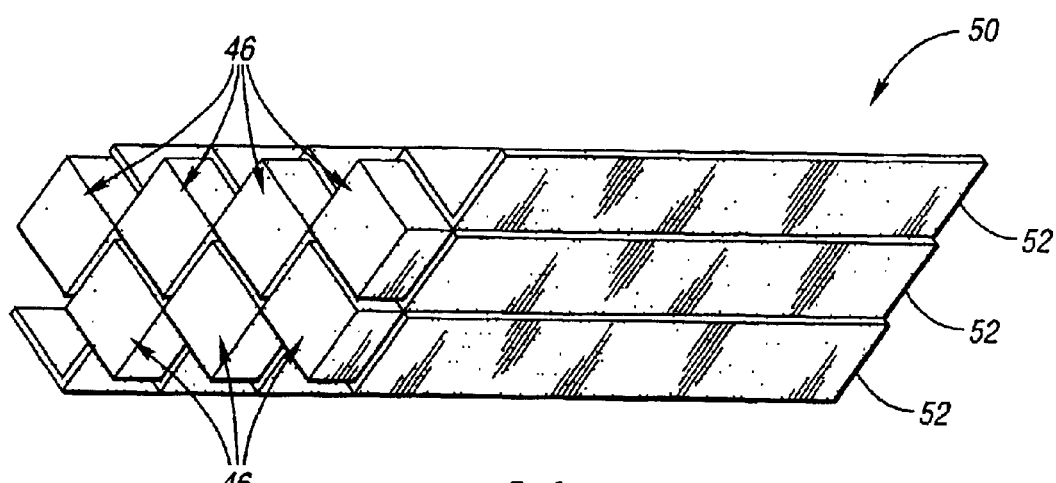
FIG. 9 is a perspective, schematic view of the detectors of FIG. 8 sandwiched between corrugated sheets of high-density material to form an array of detectors of the present invention.

FIG. 9 illustrates a large array of detector-collimator Frisch grid assemblies, generally indicated at 50, by stacking corrugated conductive sheets 52 onto rows of detectors such as the detectors 46.

The array 50 can be formed by linking corrugated conductive sheets 52, such as lead (Pb) or coated lead sheets 52, which can be stacked to make the array 50. The detectors 46 can be placed in pieces as it is formed, thereby forming the array 50 of collimated Frisch grid semiconductor detectors 46.

Figures 10A, 10B:
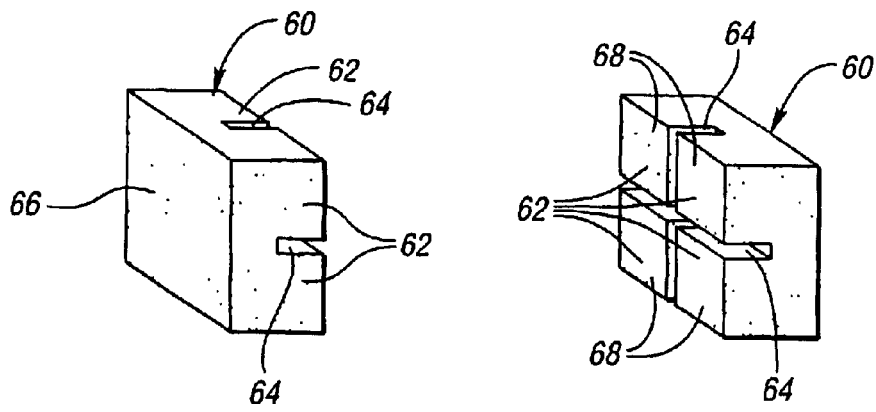
FIGS. 10a and 10b are back and front perspective, schematic views, respectively, of a pixelated semiconductor detector for use with the structure of FIG. 8.

FIGS. 10a and 10b are back and front views, respectively, of a single detector in the form of a pixelated semiconductor detector, generally indicated at 60, having many detector portions 62, or pixels, which can be separated by grooves 64, into which a multi-compartment structure such as the structure 42 of FIG. 8 can be inserted. As shown in FIG. 10a, the detector 60 includes a contact or electrode 66, and a plurality of contacts 68 on the detector portions 62 are shown in FIG. 10b.

It is best that the collimator parts of the present invention be fabricated from dense conductive material, such as lead or tungsten. To improve conductivity, the collimator parts may be coated or plated with higher conductivity material, such as gold, silver, copper, or aluminum. Heavy metals allow for efficient collimation of background and scattered gamma rays, and the high conductivity improves the electric field screening effect of the resulting Frisch grid of the housing parts adjacent the collimator parts.

The above-described collimated gamma ray detector(s) provides the following:

1. High energy resolution—the Frisch grid increases energy resolution response;
2. High spatial resolution—the collimator parts effectively reduces the background gamma ray contamination and improves directionality sensing;
3. Allows for individual selection of preferred crystals for the device;
4. Versatile—the array can be made small and compact or large, according to need;
5. Devices damaged or that may degrade during operation can be unplugged and replaced easily; and
6. Simple—the device is very straightforward and does not require any complicated correction electronics to operate the detectors.

Figure 11:
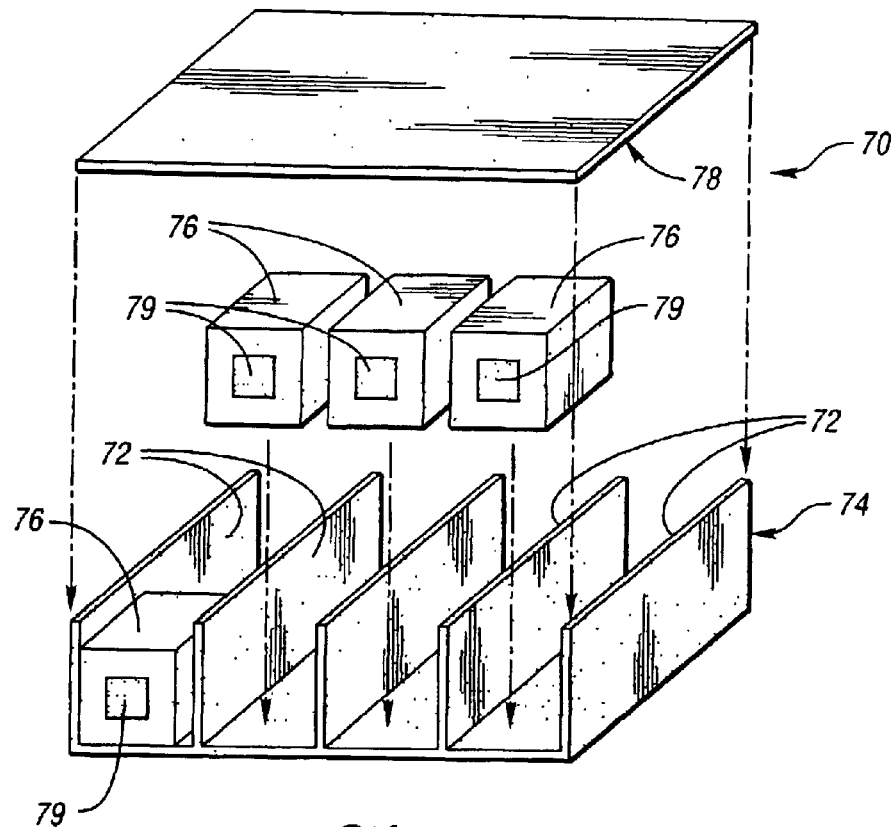
FIG. 11 is an exploded, perspective, schematic view of an array of detectors having small anodes and a machined part of a structure including housing and collimator parts.

FIG. 11 shows another method by which an array of collimated radiation detectors, generally indicated at 70, can be constructed. A block of metal or other conductive collimator material has slots 72 machined therethrough to form a slotted structure 74 which, in turn, forms housing and collimator parts or portions. Semiconductor detector devices or detectors 76 can be laid within the slots 72 such that one end protrudes from the slots 72. A top conductive plate 78 is laid over the slots 72 to complete the collimator and Frisch grid array 70.

The semiconductor detectors 76 placed within the collimator and Frisch grid array 70 have signal collection contacts 79 shown as anodes which are smaller than the opposite contacts which form cathodes. The smaller signal collection contacts 79 assist with improving the detected radiation energy resolution and decrease the capacitance of the array 70.

Figure 12:
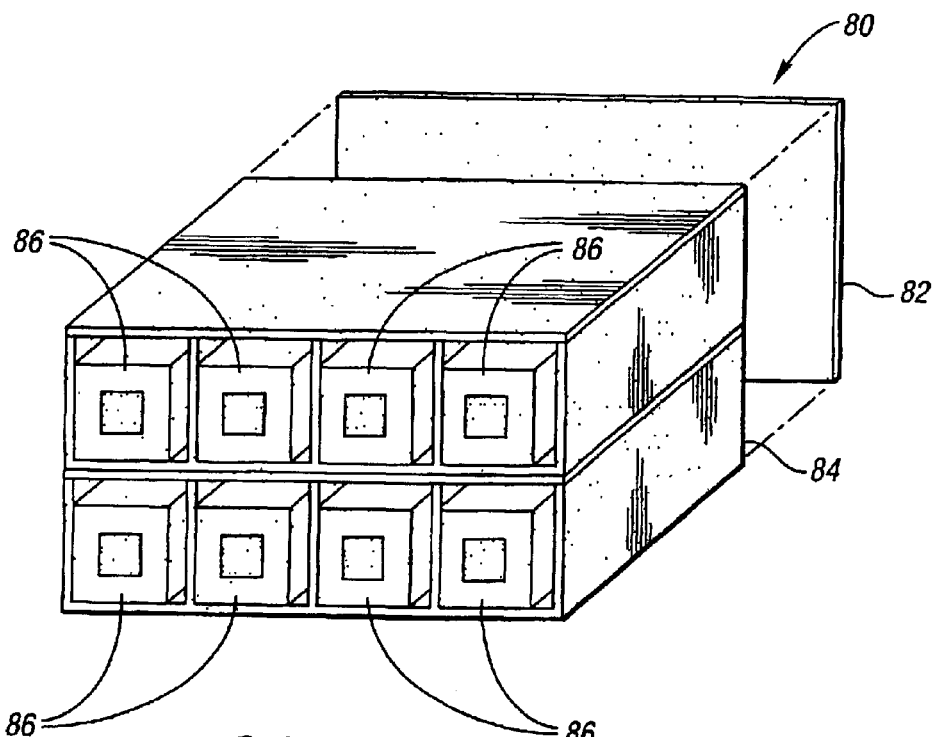
FIG. 12 is a partially exploded, perspective, schematic view of an array of detectors of FIG. 11 with a conductive backing plane.

FIG. 12 shows another method by which a Frisch grid and collimator array, generally indicated at 80, may be assembled in which a light-impenetrable, conductive metal plate 82, such as aluminum, is fastened over the opposite open end of a collimator part of a structure 84 which has been formed from two structures of FIG. 11. The conductive metal plate 82 serves to block UV, visible, IR and radio frequency electromagnetic energy from interfering with the performance of detectors 86 which are substantially identical to the detectors 76 of FIG. 11. In other words, the conductive plate 82 shields the detectors 86 from light and RF noise.

Figure 13:
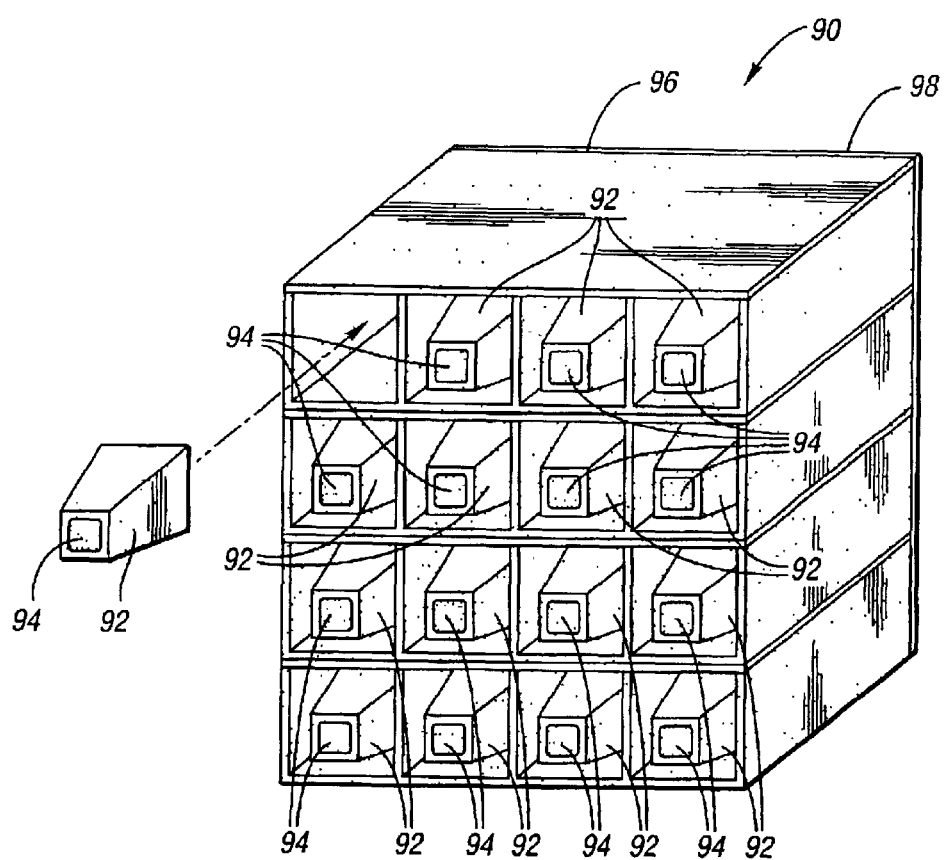
FIG. 13 is a partially exploded, perspective, schematic view of an array of tapered detectors with small anodes.

FIG. 13 shows modules of detectors assembled in an array, generally indicated at 90. FIG. 13 shows another method of improving the detector performance in which detectors 92 are tapered towards signal collection contacts or electrodes 94, thereby providing geometric weighting to the detectors 92. The combined effects of geometric weighting, the small collection contacts 94 and a Frisch grid housing and collimator of a structure 96 work to greatly improve the detector system energy resolution. A conductive plate 98 shields the detectors 92 from electromagnetic noise.

Figure 14:
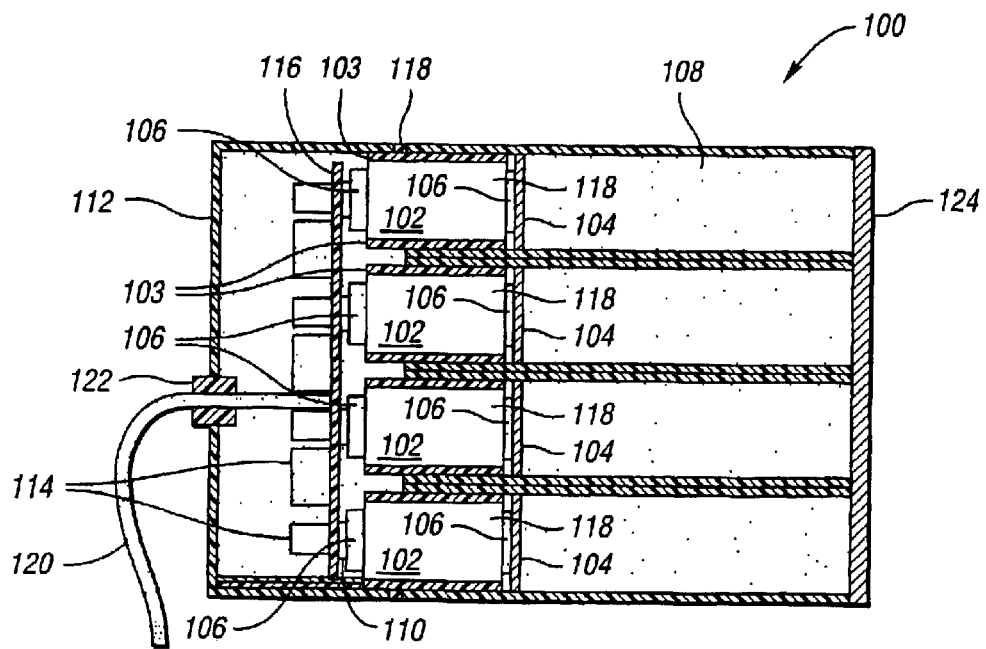
FIG. 14 is a side sectional view of a collimated radiation detector module of the present invention.

FIG. 14 is a cross sectional side view of a detector module, generally indicated at 100, in which an array of detectors 102 is brought into electrical contact with the inner conductive stop plates or metal inserts 104 by means of a soft conductive material 106, such as conductive rubber. The inserts 104 divide a structure 108 into housing and collimator parts. The detectors 102 have no need to be permanently fastened to the stop plates 104. Furthermore, soft conductive material 106, such as conductive rubber, is coupled to circuitry and connections 110 held within an assembly lid 112 of the module 100. Upon closing the lid 112, the circuitry and connections 110 make conductive contact to the signal collection side of the detectors 102 by means of the material 106. The soft conductive material 106 supplies conductive contact to readout circuitry or electronics 114 on a circuit board 116 of the Frisch grid collimator module 100. A Frisch grid separator 118 can be placed between the structure 108 and the assembly lid 112 to insure the Frisch grid effect is not compromised.

The miniature electronics 114 supported on the circuit board 116 can be used to read the radiation-induced signals from the array of detectors 102. Output wires 120 from the electronics 114 pass through the lid 112 and an apertured stopper 122 and can go to signal recording electronics, such as multichannel analyzers.

The detectors 102 can be removed and replaced with great ease from the module 100. A conductive plate 124 shields the detectors 102 from electromagnetic noise.

Figure 15:
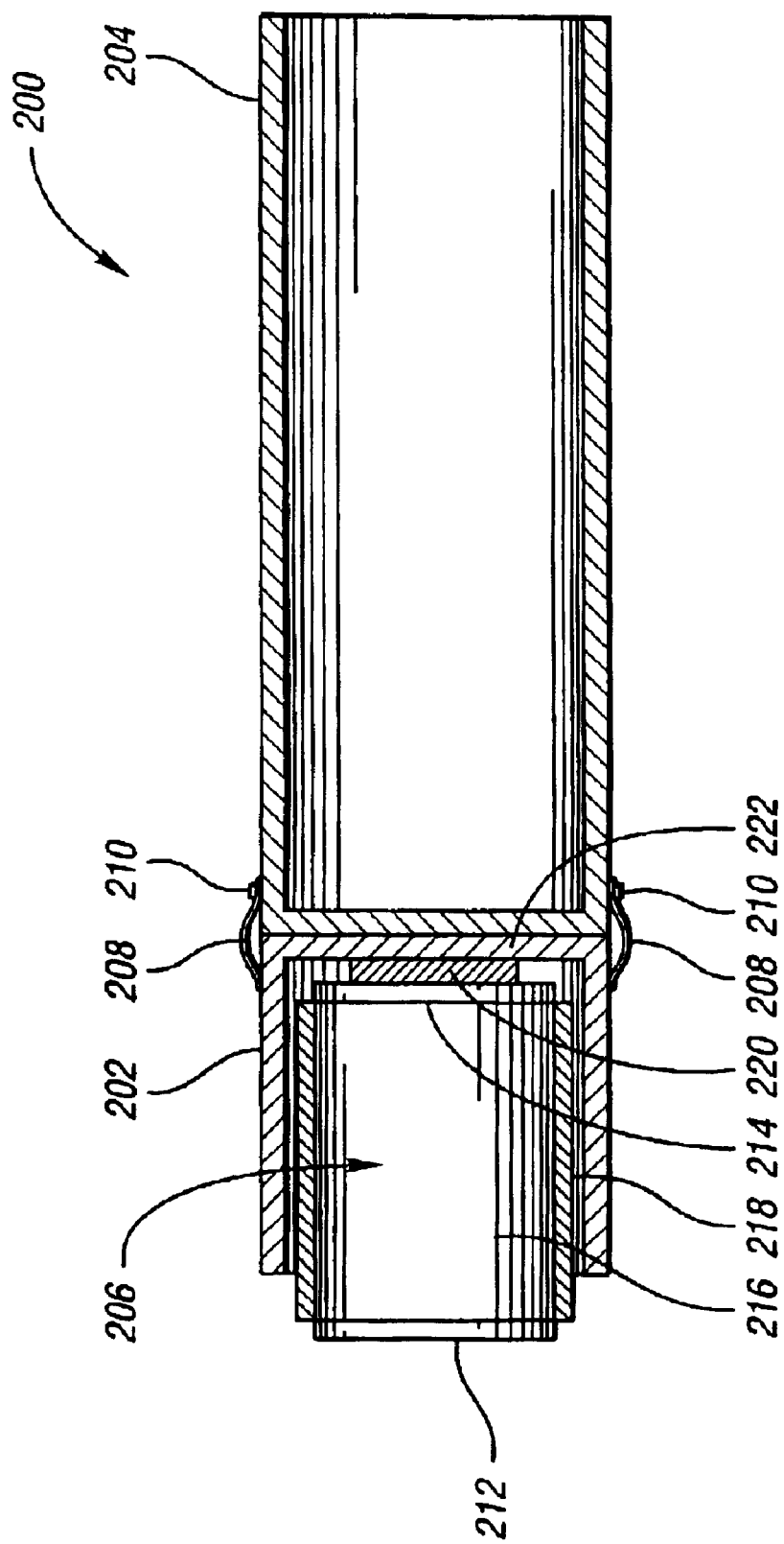
FIG. 15 is a perspective schematic view in cross section of another assembly of the present invention wherein a structure is fashioned from two parts which are connected together.

As shown in FIG. 15, a detector assembly, generally indicated at 200, can also be fashioned from two or more pieces in which one piece is a detector housing 202 and another piece is a collimator 204. The two pieces 202 and 204 can be clamped or clipped together with an indexing system such that the collimator hollow piece or tube 204 aligns with a detector, generally indicated at 206, and the detector housing 202. The pieces 202 and 204 can be fastened by an number of means, including fasteners such as clips and screws, or adhesives such as glue. FIG. 15 shows the pieces 202 and 204 connected together by clips 208 and pegs 210.

The detector 206 includes an anode 212, a cathode 214 and a substrate 216. An insulating layer 218 is placed around the detector 206. A soft conductive material 220, such as a conductive rubber, brings an end portion 222 of the housing 202 into electrical contact with the cathode 214.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A collimated radiation detector assembly comprising:
   a high resolution radiation detector including an ionization substrate having first, second and third surfaces, the second surface opposing the first surface and the third surface being located between the first and second surfaces, the detector further including a first electrode disposed at the first surface and a second electrode disposed at the second surface; and
   a structure including a housing having a compartment for housing the detector and a conductive collimator aligned with the housing for collimating radiation to the detector, the housing dividing the substrate into interaction, measurement and pervious regions.

2. The assembly as claimed in claim 1 wherein the housing acts as a grid.

3. The assembly as claimed in claim 1 wherein the housing acts as a Frisch grid.

4. The assembly as claimed in claim 1 wherein the measurement region of the substrate extends out of the housing and the pervious and interaction regions extend into the housing.

5. The assembly as claimed in claim 1 wherein the length of the compartment is greater than the length of the pervious and interaction regions.

6. The assembly as claimed in claim 1 wherein the radiation detector is a semiconductor radiation detector.

7. The assembly as claimed in claim 1 wherein the radiation detector is a semiconductor, single-charge carrier radiation detector.

8. The assembly as claimed in claim 1 wherein the radiation detector is a planar semiconductor detector.

9. The assembly as claimed in claim 1 wherein the radiation detector is a room temperature, gamma ray or x-ray detector.

10. The assembly as claimed in claim 1 further comprising insulating material disposed between the housing and the third surface in the compartment to insulate the housing from the third surface.

11. The assembly as claimed in claim 1 further comprising a member disposed in the compartment of the housing for coupling the second electrode to the housing.

12. The assembly as claimed in claim 11 wherein the member is conductive to electrically couple the second electrode to the housing.

13. The assembly as claimed in claim 1 wherein the detector is a pixelated detector having a plurality of separate detector portions and a plurality of electrodes disposed thereon and wherein the housing has a plurality of separate compartments for housing the detector portions.

14. The assembly as claimed in claim 1 wherein the substrate is tapered between the first and second surfaces to provide geometric weighting to the detector.

15. The assembly as claimed in claim 1 wherein the first electrode is substantially smaller than the second electrode to improve detected radiation energy resolution.

16. The assembly as claimed in claim 1 further comprising a shield attached to the collimator to shield the detector from electromagnetic noise.

17. The assembly as claimed in claim 1 wherein the housing and the collimator form a single structure.

18. The assembly as claimed in claim 1 wherein the housing and the collimator are separate parts which are connected together.

19. An array of collimated radiation detectors wherein each of the detectors is a detector assembly as claimed in claim 1.

20. The array as claimed in claim 19 wherein the array is an imaging array.

21. The array as claimed in claim 20 wherein the imaging array is a gamma ray or x-ray imaging array.

22. The array as claimed in claim 20 wherein the imaging array is a semiconductor-based imaging array.

23. An array of collimated radiation detectors comprising:
    a plurality of high resolution radiation detectors wherein each of the detectors includes an ionization substrate having first, second and third surfaces, the second surface opposing the first surface and the third surface being located between the first and second surfaces, each of the detectors further including a first electrode disposed at its first surface and a second electrode disposed at its second surface; and
    a structure including a housing having a plurality of separate compartments for housing the detectors and a conductive collimator aligned with the housing for collimating radiation to the detectors, the housing dividing each of the substrates into interaction, measurement and pervious regions.

24. The array as claimed in claim 23 wherein the structure is a single structure of high-density material.

25. The array as claimed in claim 23 wherein the structure includes an array of sheets of high-density material for separating adjacent detectors.

26. The array as claimed in claim 25 wherein the sheets are corrugated.

27. The array as claimed in claim 23 wherein the array is an imaging array.

28. The array as claimed in claim 27 wherein the imaging array is a gamma ray or x-ray imaging array.

29. The array as claimed in claim 27 wherein the imaging array is a semiconductor-based imaging array.

30. The array as claimed in claim 23 wherein each of the substrates is tapered between its first and second surfaces to provide geometric weighting to the detectors.

31. The array as claimed in claim 23 wherein the first electrode of each of the detectors is substantially smaller than the second electrode to improve detected radiation energy resolution.

32. The array as claimed in claim 23 further comprising a shield attached to the collimator to shield the detectors from electromagnetic noise.

33. The array as claimed in claim 23 wherein the structure includes at least one slotted structure of high-density material.

34. The array as claimed in claim 23 wherein the housing and the collimator form a single structure.

35. The array as claimed in claim 23 wherein the housing and the collimator are separate parts which are connected together.

36. A collimated radiation detector module comprising:
    an array of collimated radiation detectors including:
    a plurality of high resolution radiation detectors wherein each of the detectors includes an ionization substrate having first, second and third surfaces, the second surface opposing the first surface and the third surface being located between the first and second surfaces, each of the detectors further including a first electrode disposed at its first surface and a second electrode disposed at its second surface; and
    a structure including a housing having a plurality of separate compartments for housing the detectors and a collimator aligned with the housing for collimating radiation to the detectors, the housing dividing each of the substrates into interaction, measurement and pervious regions;

circuitry for collecting signals from the detectors; and a lid connected to the structure for covering the circuitry.

37. The module as claimed in claim 36 wherein each of the substrates is tapered between its first and second surfaces to provide geometric weighting to the detectors.

38. The module as claimed in claim 36 wherein the first electrode of each of the detectors is substantially smaller than the second electrode to improve detected radiation energy resolution.

39. The module as claimed in claim 36 further comprising a shield attached to the collimator to shield the detectors from electromagnetic noise.

40. The module as claimed in claim 36 wherein the array is an imaging array.

41. The module as claimed in claim 40 wherein the imaging array is a gamma ray or x-ray imaging array.

42. The module as claimed in claim 40 wherein the imaging array is a semiconductor-based imaging array.

43. The module as claimed in claim 36 further comprising soft conductive material for establishing electrical connections with the first and second electrodes of the detectors.

44. The module as claimed in claim 36 wherein the housing and the collimator form a single structure.

45. The module as claimed in claim 36 wherein the housing and the collimator are separate parts which are connected together.

* * * * *